(12) United States Patent
Zhou et al.

(10) Patent No.: US 11,594,763 B2
(45) Date of Patent: Feb. 28, 2023

(54) ALL-SOLID LITHIUM BATTERY AND METHOD FOR MANUFACTURING THE SAME

(71) Applicant: BOE TECHNOLOGY GROUP CO., LTD., Beijing (CN)

(72) Inventors: Quanguo Zhou, Beijing (CN); Lijia Zhou, Beijing (CN); Zhidong Wang, Beijing (CN); Rongjian Yan, Beijing (CN); Jiuyang Cheng, Beijjing (CN); Ronghua Lan, Beijing (CN); Yungchiang Lee, Beijing (CN); Yancheng Lu, Beijing (CN); Qingguo Yang, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 281 days.

(21) Appl. No.: 16/629,074

(22) PCT Filed: Apr. 24, 2019

(86) PCT No.: PCT/CN2019/084125
§ 371 (c)(1),
(2) Date: Jan. 7, 2020

(87) PCT Pub. No.: WO2020/019784
PCT Pub. Date: Jan. 30, 2020

(65) Prior Publication Data
US 2021/0226256 A1   Jul. 22, 2021

(30) Foreign Application Priority Data
Jul. 26, 2018  (CN) .......................... 201810835143.2

(51) Int. Cl.
*H01M 10/0585* (2010.01)
*H01M 50/209* (2021.01)
(Continued)

(52) U.S. Cl.
CPC ..... *H01M 10/0585* (2013.01); *H01M 4/0404* (2013.01); *H01M 4/0492* (2013.01); *H01M 10/052* (2013.01); *H01M 50/209* (2021.01)

(58) Field of Classification Search
None
See application file for complete search history.

(56) References Cited

U.S. PATENT DOCUMENTS 7,288,340 B2   10/2007   Iwamoto
9,735,443 B2   8/2017   Takahashi et al.
(Continued)

FOREIGN PATENT DOCUMENTS

CN   1532982   9/2004
CN   103378337   10/2013
(Continued)

OTHER PUBLICATIONS

International Search Report and Written Opinion dated Jul. 24, 2019 for PCT Patent Application No. PCT/CN2019/084125.
(Continued)

*Primary Examiner* — Carmen V Lyles-Irving
(74) *Attorney, Agent, or Firm* — Perilla Knox & Hildebrandt LLP; Kenneth A. Knox

(57) ABSTRACT

A method for manufacturing an all-solid lithium battery includes: providing a substrate; and forming M rows×N columns of lithium battery cells on the substrate, wherein each of the lithium battery cells includes a positive electrode current collector layer, a positive electrode layer, an electrolyte layer, a negative electrode layer, and a negative electrode current collector layer.

9 Claims, 13 Drawing Sheets

(51) Int. Cl.
  *H01M 4/04*   (2006.01)
  *H01M 10/052*  (2010.01)

(56) References Cited

U.S. PATENT DOCUMENTS

| | | | |
|---|---|---|---|
| 2004/0185334 A1* | 9/2004 | Iwamoto | H01M 10/0436 429/127 |
| 2011/0223467 A1* | 9/2011 | Shacklette | H01M 50/51 29/623.5 |
| 2013/0273405 A1 | 10/2013 | Takahashi et al. | |
| 2015/0221974 A1 | 8/2015 | Upadhyaya et al. | |
| 2017/0301946 A1 | 10/2017 | Takahashi et al. | |
| 2017/0301955 A1* | 10/2017 | Kwak | B29C 59/16 |

FOREIGN PATENT DOCUMENTS

| | | |
|---|---|---|
| CN | 207601282 | 7/2018 |
| CN | 109004283 | 12/2018 |
| EP | 1460701 A2 | 9/2004 |
| EP | 1460701 A3 | 6/2006 |
| EP | 1460701 B1 | 8/2008 |

OTHER PUBLICATIONS

1st Office Action dated Mar. 3, 2020 for Chinese Patent Application No. 201810835143.2.

\* cited by examiner

ALL-SOLID LITHIUM BATTERY AND METHOD FOR MANUFACTURING THE SAME

CROSS-REFERENCE TO RELATED APPLICATIONS

This application is a national phase application under 35 U.S.C. § 371 of International Patent Application No. PCT/CN2019/084125, filed on Apr. 24, 2019, which claims priority to Chinese Patent Application No. 201810835143.2, filed on Jul. 26, 2018, the entire contents of both of which are incorporated herein by reference.

TECHNICAL FIELD

Embodiments of the present disclosure relate to the field of lithium batteries and, more particularly, to an all-solid lithium battery and a method for manufacturing the same.

BACKGROUND

With the miniaturization and the rise of wearable electronic products, flexible electronics have become more portable, bendable, efficient, low-cost, and recyclable, and development of all-solid lithium batteries has become one of the frontiers in the field of energy storage research. All-solid lithium batteries have advantages that other energy equipment does not have: high safety, low cost, high temperature chargeable and dischargeable, long cycle life, fast charging, and long life-span, and have become the first choice in the future energy field.

Currently, in order to meet the demand for lighter, thinner, and long life-span lithium batteries, the existing all-solid lithium battery is made in the form of films. According to the research of the inventors, the respective films in the existing all-solid lithium battery are easily cracked, so that the reliability of the all-solid lithium battery is reduced, and even in a severe case, the all-solid lithium battery may not operate normally.

SUMMARY

In order to solve the above technical problems, the embodiments of the present disclosure provides an all-solid lithium battery and a method for manufacturing the same, which may be capable of improving the reliability of the all-solid lithium battery and ensuring the normal operation of the all-solid lithium battery.

According to a first aspect of embodiments of the present disclosure, there is provided for a method for manufacturing an all-solid lithium battery including: providing a substrate; and forming M rows×N columns of lithium battery cells on the substrate, wherein each of the lithium battery cells includes a positive electrode current collector layer, a positive electrode layer, an electrolyte layer, a negative electrode layer, and a negative electrode current collector layer, M≥1, N≥1, and at most one of M and N is 1.

Optionally, the method also includes:

forming a first electrode and a second electrode on the substrate.

Optionally, the forming the M rows×N columns of lithium battery cells on the substrate includes:

forming the positive electrode current collector layer of the M rows×N columns of lithium battery cells and a first connection layer on the substrate, the first connection layer being for connecting the positive electrode current collector layers of adjacent lithium battery cells, and connecting the positive electrode current collector layer of a first column of lithium battery cells to the first electrode;

sequentially forming the positive electrode layer, the electrolyte layer, and the negative electrode layer on the positive electrode current collector layer;

forming an isolation layer for isolating adjacent lithium battery cells on the substrate; and forming the negative electrode current collector layer and a second connection layer on the negative electrode layer and the isolation layer, the second connection layer being used for connecting the negative electrode current collector layers of the adjacent lithium battery cells, and connecting the negative electrode current collector layer of a last column of lithium battery cells the second electrode.

Optionally, the forming the M rows×N columns of lithium battery cells on the substrate includes:

forming the positive electrode current collector layer of the M rows×N columns of lithium battery cells and a first connection layer on the substrate, the first connection layer being used for connecting the positive electrode current collector layer of each of the lithium battery cells to the first electrode;

sequentially forming the positive electrode layer, the electrolyte layer, and the negative electrode layer on the positive electrode current collector layer;

forming an isolation layer for isolating adjacent lithium battery cells on the substrate; and forming the negative electrode current collector layer and a second connection layer on the negative electrode layer and the isolation layer, the second connection layer being used for connecting the negative electrode current collector layer of each of the lithium battery cells to the second electrode.

Optionally, the forming the positive electrode current collector layer of the M rows×N columns of lithium battery cells and the first connection layer on the substrate includes:

depositing a positive electrode current collector film on the substrate, and etching the positive electrode current collector film by a laser process or a photolithography process to form the positive electrode current collector layer and the first connection layer; or forming the positive electrode current collector layer of the M rows×N columns of lithium battery cells on the substrate by an evaporation process using a first mask, and forming the first connection layer by the evaporation process using a second mask.

Optionally, the forming the negative electrode current collector layer and the second connection layer on the negative electrode layer and the isolation layer includes:

depositing a negative electrode current collector film on the negative electrode layer and the isolation layer, and etching the negative electrode current collector film by a laser process to form the negative electrode current collector layer and the second connection layer; or forming the negative electrode current collector layer on the negative electrode layer and the isolation layer by an evaporation process using a first mask, and forming the second connection layer by the evaporation process using a second mask.

Optionally, the method further includes:

forming an encapsulation layer on the lithium battery cells.

According to a second aspect of embodiments of the present disclosure, there is provided for an all-solid lithium battery including: a substrate; and M rows×N columns of lithium battery cells disposed on the substrate;

wherein each of the lithium battery cells comprises a positive electrode current collector layer, a positive electrode layer, an electrolyte layer, a negative electrode layer, and a negative electrode current collector layer, M≥1, N≥1, and at most one of M and N is 1.

Optionally, the all-solid lithium battery further includes a first electrode and a second electrode disposed on the substrate.

Optionally, the all-solid lithium battery further includes a first connection layer and a second connection layer; and wherein the first connection layer is disposed on a same layer as the positive electrode current collector layer, and used for connecting the positive electrode current collector layers of adjacent lithium battery cells and connecting the positive electrode current collector layer of a first column of lithium battery cells to the first electrode; and the second connection layer is disposed on a same layer as the negative electrode current collector layer, and used for connecting the negative electrode current collector layers of the adjacent lithium battery cells and connecting the negative electrode current collector layer of a last column of the lithium battery cell to the second electrode.

Optionally, the all-solid lithium battery further includes a first connection layer and a second connection layer; and wherein the first connection layer is disposed on a same layer as the positive electrode current collector layer, and used for connecting the positive electrode current collector layer of each of the lithium battery cells to the first electrode; and the second connection layer is disposed on a same layer as the negative electrode current collector layer, and used for connecting the negative electrode current collector layer of each of the lithium battery cells to the second electrode.

Optionally, the all-solid lithium battery further includes an isolation layer disposed on the substrate; and wherein the isolation layer is used for isolating the positive electrode current collector layer, the positive electrode layer, the electrolyte layer, and the negative electrode layer of adjacent lithium battery cells.

Optionally, an interval between adjacent lithium battery cells is 1~100 microns.

Optionally, the all-solid lithium battery further includes an encapsulation layer; and the encapsulation layer is disposed on the lithium battery cells.

Embodiments of the present disclosure provide an all-solid lithium battery and a method for manufacturing the same. The method for manufacturing an all-solid lithium battery includes: providing a substrate; and forming M rows×N columns of lithium battery cells on the substrate, wherein each of the lithium battery cells includes a positive electrode current collector layer, a positive electrode layer, an electrolyte layer, a negative electrode layer, and a negative electrode current collector layer. According to embodiments of the present disclosure, by disposing the lithium battery cells arranged in an array form on the substrate, it is ensured that the size of the lithium battery cells in the present application is smaller than that of the lithium battery in the prior art under the same area, the surface stress of respective film layers in the lithium battery cells is released, the cracking of each film is avoided, the reliability of the all-solid lithium battery is improved, the normal operation of the all-solid lithium battery is ensured, life of the all-solid lithium battery is greatly improved, and, in production, yield is also greatly increased, cost is reduced, and competitiveness of products is enhanced.

Other features and advantages of the present disclosure will be set forth in the description which follows, and in part, become apparent form the description, or be learned from the implementation of the disclosure. The objectives and other advantages of the present disclosure may be realized and obtained by structures particularly pointed out in the description, the claims, and the accompanying drawings.

BRIEF DESCRIPTION OF THE DRAWINGS

The accompanying drawings, which constitute a part of the description, are used to explain the technical solutions of the present disclosure, together with the embodiments of the present application, and do not constitute a limitation of the technical solutions of the present disclosure, serve to provide a further understanding of the technical solutions of the present disclosure.

DETAILED DESCRIPTION

The embodiments of the present disclosure will be described in detail below with reference to the accompanying drawings in order to make the objects, technical solutions, and advantages of the present disclosure more clear. It should be noted that, in the case of no conflict, the embodiments and the features in the embodiments in the present application may be arbitrarily combined with each other.

The steps illustrated in the flowchart of the drawings may be executed in a computer system such as a set of computer executable instructions. Also, although logical sequences are shown in the flowcharts, in some cases the steps shown or described may be performed in a different order than the ones described herein.

Unless otherwise defined, technical or scientific terms used in the embodiments of the present disclosure should have the same meaning as commonly understood by one of ordinary skill in the art to which the present disclosure belongs. The words "first", "second" and similar expressions used in the embodiments of the present disclosure do not denote any order, quantity, or importance, but are merely used to distinguish different components. The word "comprising", "including", or the like means that the elements or items that precede the word cover the elements or the items and its equivalents listed after the word, and does not exclude other elements or items. The word "connected", "connecting", or the like is not limited to physical or mechanical connections, but may include electrical connections, whether direct or indirect. "Upper", "lower", "left", "right", and the like are only used to indicate relative positional relationships, and when the absolute position of the described object is changed, the relative positional relationship may also change accordingly.

Figure 1A:
FIG. 1A is a side view of a conventional all-solid lithium battery.
Figure 1B:
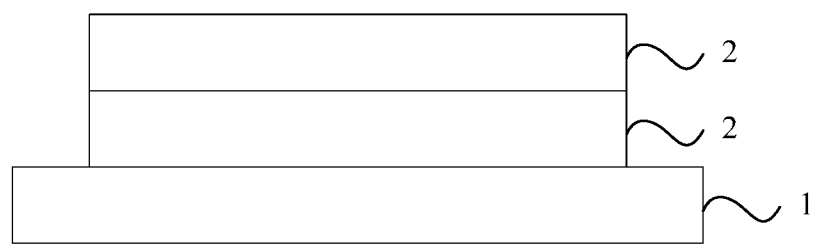
FIG. 1B is another side view of a conventional all-solid lithium battery.
Figure 1C:
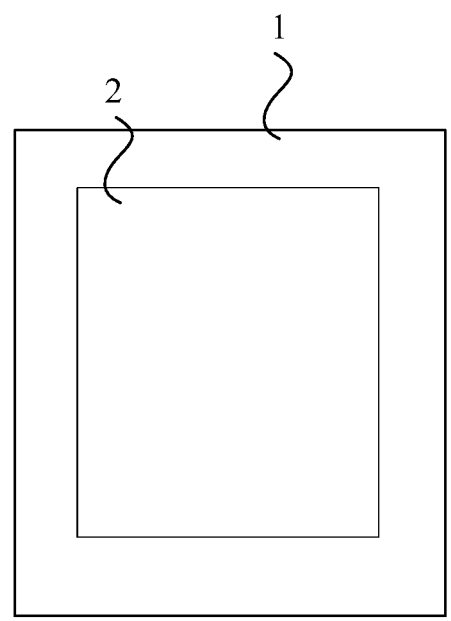
FIG. 1C is a top plan view of a conventional all-solid lithium battery.

A conventional all-solid lithium battery adopts a film structure. FIG. 1A is a side view of a conventional all-solid lithium battery, FIG. 1B is another side view of a conventional all-solid lithium battery, and FIG. 1C is a top plan view of a conventional all-solid lithium battery. As shown in FIGS. 1A to 1C, the all-solid lithium battery includes a substrate 1 and a plurality of lithium batteries 2 disposed on the substrate 1, where, by way of example, FIG. 1A includes one lithium battery and FIG. 1B includes two lithium batteries.

In order to improve life-span of the all-solid lithium battery, the prior art provides two schemes: the first one is increasing the film-forming electrodes of the all-solid lithium battery. However, after research by the inventors, it has been found that with the film-forming area of the all-solid lithium battery increases, the surface stress of each layer of the films increases, which may cause cracking phenomenon of each film in the all-solid lithium battery, ultimately leading to a decrease in the reliability of the all-solid lithium battery, and in a severe case, a short circuit occurring between positive and negative electrodes, resulting in the all-solid lithium battery not working normally. The second scheme is increasing the number of layers of the lithium batteries in the all-solid lithium battery. Similarly, as the number of layers of the all-solid lithium battery is continuously superimposed, the thickness of the entire all-solid lithium battery is also increasing. It's well known that the higher the thickness, the greater the surface stress of the films, which may cause cracking phenomenon of each film in the all-solid lithium battery and ultimately may lead to a decrease in the reliability of the all-solid lithium battery, and in a severe case, a short circuit occurring between positive and negative electrodes and resulting in the all-solid lithium battery not working normally.

In order to solve the technical problems that the reliability of the conventional all-solid lithium battery is degraded and that in a severe case it may not work normally, embodiments of the present disclosure provide an all-solid lithium battery and a method for manufacturing the same. The specific illustrations are as follows.

Figure 2:
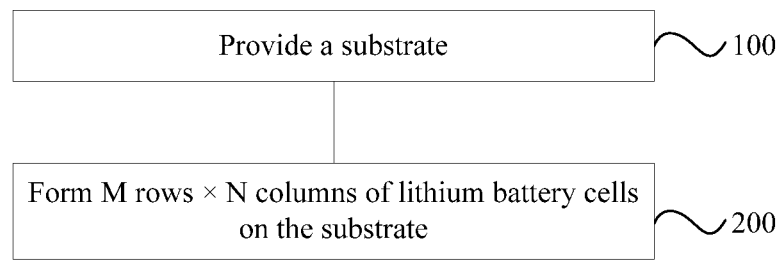
FIG. 2 is a flowchart showing a method for manufacturing an all-solid lithium battery according to an embodiment of the present disclosure.

Based on the inventive concept of the above embodiments, an embodiment of the present disclosure provides a method for manufacturing an all-solid lithium battery. FIG. 2 is a flowchart showing a method for manufacturing an all-solid lithium battery according to an embodiment of the present disclosure. As shown in FIG. 2, the method for manufacturing the all-solid lithium battery according to the embodiment of the present disclosure includes following steps.

In step 100, a substrate is provided.

Optionally, the substrate may be glass, plastic, polymer, metal sheet, silicon wafer, quartz, ceramic, mica, or the like. The substrate may also be a flexible substrate, wherein the examples of the materials for forming the flexible substrate include polyimide (PI), polyethylene terephthalate (PET), zirconium oxide, aluminum oxide, or the like.

In step 200, M rows×N columns of lithium battery cells are formed on the substrate.

Each of the lithium battery cells includes a positive electrode current collector layer, a positive electrode layer, an electrolyte layer, a negative electrode layer, and a negative electrode current collector layer.

Specifically, $M \geq 1$, $N \geq 1$, and at most one of M and N is 1.

Specifically, the lithium battery cells in the embodiment of the present disclosure may be disposed in the same layer, and the structure and thickness of each of the lithium battery cells may be the same. An interval between adjacent two lithium battery cells may be 1~100 microns.

Optionally, the number of the positive electrode current collector layer, the positive electrode layer, the electrolyte layer, the negative electrode layer, and the negative electrode current collector layer included in each of the lithium battery cells is at least one. The embodiment of the present disclosure does not specifically limit the number of each layer, which is specifically defined according to actual needs.

Optionally, the material for forming the positive electrode current collector layer may be aluminum foil, and the material for forming the negative current collector layer may be copper foil. In order to ensure the internal stability of the current collectors in the all-solid lithium battery, the purity of both the current collectors is required to be above 98%.

Optionally, the material for forming the positive electrode layer includes nickel cobalt lithium aluminate, lithium rich, lithium manganate, lithium titanate, and lithium iron phosphate. Further, the positive electrode layer generally adopts a composite electrode. In addition to an electrode active material, a solid electrolyte and a conductive agent, which serve to transport ions and electrons in the electrodes, are included.

Optionally, the material for forming the negative electrode layer includes at least one selected from metal lithium, an alloy, and an oxide. Optionally, the alloy includes lithium alloy and/or silicon-based alloy.

Optionally, the electrolyte layer is a solid inorganic lithium ion conductor, and the preparing material thereof includes lithium phosphate ($LiPO_4$), lithium oxide ($Li_3O_X$), lithium titanium phosphate $LiTi_2(PO_4)_3$, or the like.

According to an embodiment of the present disclosure, there is provided a method for manufacturing an all-solid lithium battery, including: providing a substrate, and forming M rows×N columns of lithium battery cells on the substrate, wherein each of the lithium battery cells includes a positive electrode current collector layer, a positive electrode layer, an electrolyte layer, a negative electrode layer, and a negative electrode current collector layer. In the embodiment of the present disclosure, by providing the lithium battery cells arranged in an array form on the substrate, it is ensured that the size of the lithium battery cells in the present application is smaller than that of the lithium battery in the prior art under the same area, the surface stress of respective film layers in the lithium battery cells is released, the cracking of each film is avoided, and the reliability of the all-solid lithium battery is improved. Further, normal operation of the all-solid lithium battery is ensured, life of the all-solid lithium battery is greatly improved, and in production, yield is also greatly increased, cost is reduced, and competitiveness of products is enhanced.

Optionally, the method for manufacturing the all-solid lithium battery according to the embodiment of the present disclosure further includes: forming a first electrode and a second electrode on the substrate.

In particular, the first electrode is a positive electrode, the second electrode is a negative electrode, and the first electrode and the second electrode are symmetrically disposed on two sides of the substrate. The embodiment of the present disclosure does not specifically limit the positions of the first and second electrodes, wherein the first and second electrodes are disposed in the same layer as the positive electrode current collector layer disposed close to the substrate.

In the present embodiment, the material for forming the first electrode and the second electrode may be indium tin oxide or metal, and the embodiment of the present disclosure is not limited thereto.

Specifically, when the first electrode and the second electrode are made of indium tin oxide or the preparing material thereof is different from that of the positive electrode current collector, the forming the first electrode and the second electrode on the substrate may occur after step 200, or it may occur after the positive electrode current collector layer is formed on the substrate. When the preparing material of the first electrode and the second electrode is the same as that of the positive electrode current collector, in order to simplify the manufacturing process, the forming the first electrode and the second electrode on the substrate may occur in the same step as forming the positive electrode current collector layer on the substrate.

Optionally, as an embodiment, the step 200 specifically includes: forming the positive electrode current collector layer of the M rows×N columns of lithium battery cells and a first connection layer on the substrate; sequentially forming the positive electrode layer, the electrolyte layer and the negative electrode layer on the positive electrode current collector layer; forming an isolation layer for isolating adjacent lithium battery cells on the substrate; and forming the negative electrode current collector layer of the M rows×N columns of lithium battery cells and a second connection layer on the negative electrode layer of the M rows×N columns of lithium battery cells and the isolation layer.

Specifically, in the present embodiment, the first connection layer is used to connect the positive electrode current collector layers of the adjacent lithium battery cells, and to connect the positive electrode current collector layer of the lithium battery cell in the first column to the first electrode. In addition, the second connection layer is used to connect the negative electrode current collector layers of the adjacent lithium battery cells, and to connect the negative electrode current collector layer of the lithium battery cell in the last column to the second electrode. The positive and negative electrode current collector layers between the adjacent lithium battery cells are connected, only when the positive electrode current collector layer of the lithium battery cell in the first column is connected to the first electrode, and the negative electrode current collector layer of the lithium battery cell in the last column is connected to the second electrode.

Optionally, as another embodiment, the step 200 specifically includes: forming the positive electrode current collector layer of the M rows×N columns of lithium battery cells and a first connection layer on the substrate, the first connection layer for connecting the positive electrode current collector layer of each of the lithium battery cells to the first electrode; sequentially forming the positive electrode layer, the electrolyte layer and the negative electrode layer on the positive electrode current collector layer; forming an isolation layer for isolating adjacent lithium battery cells on the substrate; and forming the negative electrode current collector layer and a second connection layer on the negative electrode layer and the isolation layer, the second connection layer for connecting the negative electrode current collector layer of each of the lithium battery cells to the second electrode.

In the present embodiment, the positive electrode current collector layer of each of the lithium battery cells is connected with the first electrode, the negative electrode current collector layer of each of the lithium battery cells is connected with the second electrode, whereas the positive electrode current collector layers between adjacent lithium battery cells are not connected with one another, and the negative electrode current collector layers between adjacent lithium battery cells are not connected with one another.

In an embodiment, the forming the positive electrode current collector layer of the M rows×N columns of lithium battery cells and the first connection layer on the substrate in the above two embodiments specifically includes:

depositing a positive electrode current collector film on the substrate, and etching the positive electrode current collector film by a laser process or a photolithography process to form the positive electrode current collector layer and the first connection layer; or forming the positive electrode current collector layer of the lithium battery cells of M rows×N columns on the substrate by an evaporation process using a first mask, and forming the first connection layer by the evaporation process using a second mask.

In addition, it should be noted that the positive electrode current collector layer and the first connection layer may also be formed by 3D printing.

In an embodiment, the positive electrode current collector layer and the first connection layer may be integrally formed, or may be separately disposed, which is not limited by the embodiment of the present disclosure.

Specifically, the forming the negative electrode current collector layer and the second connection layer on the negative electrode layer and the isolation layer in the above two embodiments includes: depositing a negative electrode current collector film on the negative electrode layer and the isolation layer, and etching the negative electrode current collector film by a laser process to form the negative electrode current collector layer and the second connection layer; or forming the negative electrode current collector layer on the negative electrode layer and the isolation layer by an evaporation process using a first mask, and forming the second connection layer by the evaporation process using a second mask.

In an embodiment, the negative electrode current collector layer and the second connection layer may be integrally formed, or may be separately disposed, which is not limited by the embodiment of the present disclosure.

In addition, it should be noted that the negative electrode current collector layer and the second connection layer may also be formed by 3D printing.

In an embodiment, the sequentially forming the positive electrode layer, the electrolyte layer and the negative electrode layer on the positive electrode current collector layer specifically includes: depositing a positive electrode film on the positive electrode current collector layer by a physical vapor deposition process; forming the positive electrode layer by a patterning process; depositing an electrolyte film on the positive electrode layer by the physical vapor deposition process; forming the electrolyte layer by the patterning process; and forming a negative electrode film on the electrolyte layer by the physical vapor deposition process or an evaporation process.

Optionally, the physical vapor deposition process includes a magnetron sputtering method, pulsed laser deposition method, or plasma-assisted electron beam evaporation method. Among them, the magnetron sputtering method is also called an RF magnetron sputtering method, and the target used for magnetron sputtering is selected or prepared according to the raw material, and may be prepared by a conventional method. Pulsed laser deposition method, also known as pulsed laser ablation, is a means of bombarding an object with a laser and then depositing the bombarded material onto different substrates to obtain a precipitate or film. In the plasma-assisted electron beam evaporation method, "evaporation" refers to thermal evaporation coating, in which a target is bombarded by an electron beam with kinetic energy under the action of an electric field with a potential difference of U, so that the target is heated and vaporized to realize evaporation coating. Evaporation coating refers to a method of heating a metal or non-metal material under high vacuum conditions to evaporate and condense on the surface of a plated member (metal, semiconductor, or insulator) to form a film.

Optionally, the evaporation process includes a vacuum thermal evaporation process.

Optionally, after step 200, the method for manufacturing the all-solid lithium battery according to the embodiment of the present disclosure further includes forming an encapsulation layer on the lithium battery cells.

The encapsulation layer provided in the embodiment of the present disclosure may greatly improve ability against air and moisture permeation of the battery, and extend the operation and storage life of the battery.

Optionally, the material for forming the encapsulation layer is aluminum oxide ($Al_2O_3$), silicon oxide, or silicon nitride.

Optionally, as an embodiment, a multi-layer lithium battery structure may be formed by simple stacking of a plurality of individual layers of lithium batteries, and each of the individual layers of lithium batteries includes the M rows×N columns of lithium battery cells as described above, wherein two adjacent layers of lithium batteries are separated by the encapsulation layer, and the encapsulation layer is each disposed on negative electrode current collectors of the lithium battery cells.

Optionally, as another embodiment, a multi-layer lithium battery structure may also be formed by sharing negative or positive electrode current collectors for two adjacent layers of lithium batteries, and each of the individual layers of lithium batteries includes the M rows×N columns of lithium battery cells as described above, wherein the encapsulation layer is disposed on the top lithium battery. When the number of the layers of the lithium batteries is an even number, the encapsulation layer is disposed on the positive electrode current collectors of the top lithium battery, but when the number of the layers of the lithium batteries is an odd number, the encapsulation layer is disposed on the negative electrode current collectors of the top lithium battery.

Hereinafter, the method for manufacturing the all-solid lithium battery according to the embodiment of the present disclosure is further illustrated by FIGS. 3A to 3H, by taking an example in which the first connection layer is used to connect the positive electrode current collector layers of the adjacent lithium battery cells, and to connect the positive electrode current collector layer of the lithium battery cell in the first column to the first electrode; the second connection layer is used to connect the negative electrode current collector layers of the adjacent lithium battery cells, and to connect the negative electrode current collector layer of the lithium battery cell in the last column to the second electrode; and M=N=3.

Figure 3A:
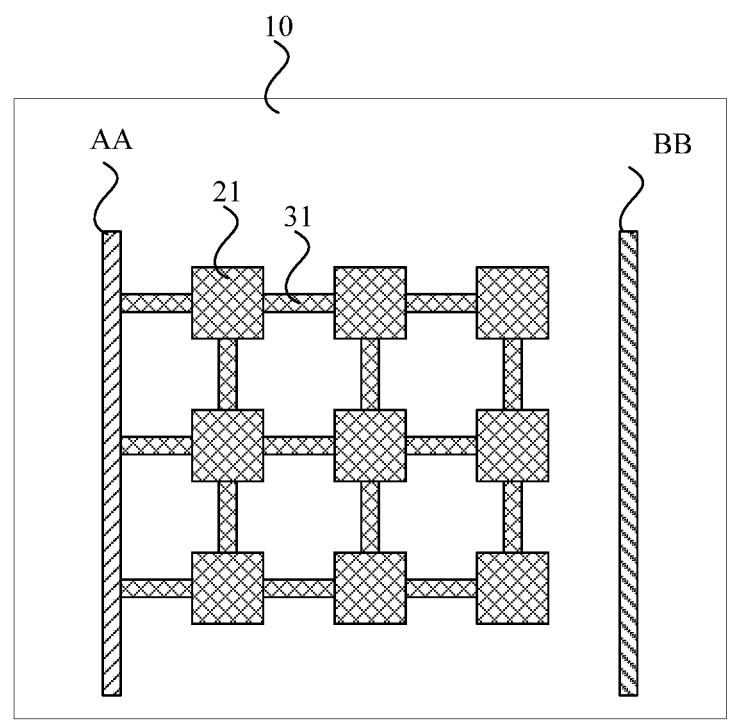
FIG. 3A is a first schematic diagram showing a first method for manufacturing an all-solid lithium battery according to an embodiment of the present disclosure.
Figure 3B:
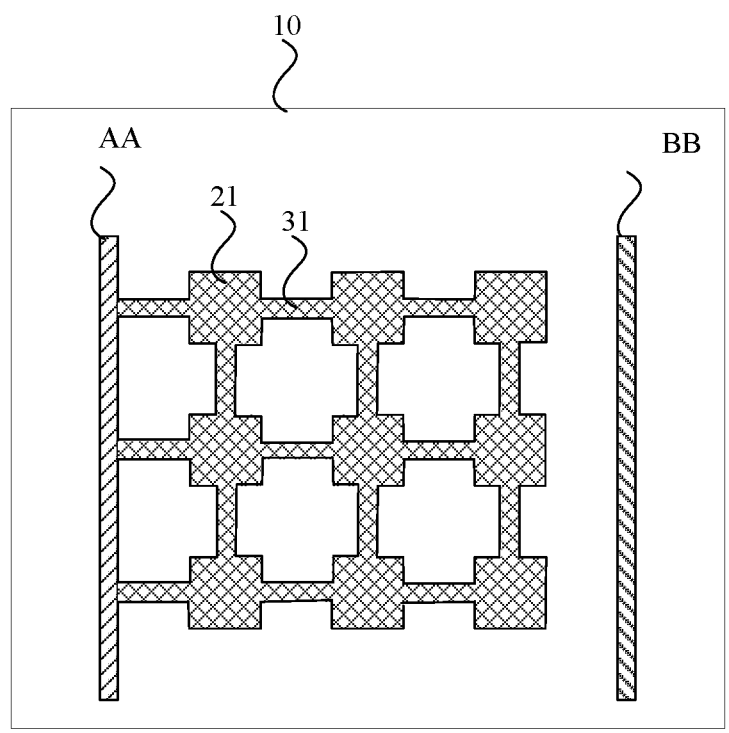
FIG. 3B is a second schematic diagram showing a first method for manufacturing an all-solid lithium battery according to an embodiment of the present disclosure.

In step 310, the first electrode AA, the second electrode BB, the positive electrode current collector layer 21 of the M rows×N columns of lithium battery cells, and the first connection layer 31 are formed on the substrate 10, as specifically shown in FIG. 3A or 3B.

Specifically, the step 310 includes: depositing a positive electrode current collector film on the substrate, and etching the positive electrode current collector film by a laser process or a photolithography process to form the positive electrode current collector layer and the first connection layer. In FIG. 3A, the positive electrode current collector layer and the first connection layer are formed by an etching process. Optionally, the positive electrode current collector layer of the M rows×N columns of lithium battery cells is formed on the substrate by an evaporation process using a first mask; and the first connection layer is formed by the evaporation process using a second mask. In FIG. 3B, the positive electrode current collector layer and the first connection layer are formed by the evaporation process.

Figure 3C:
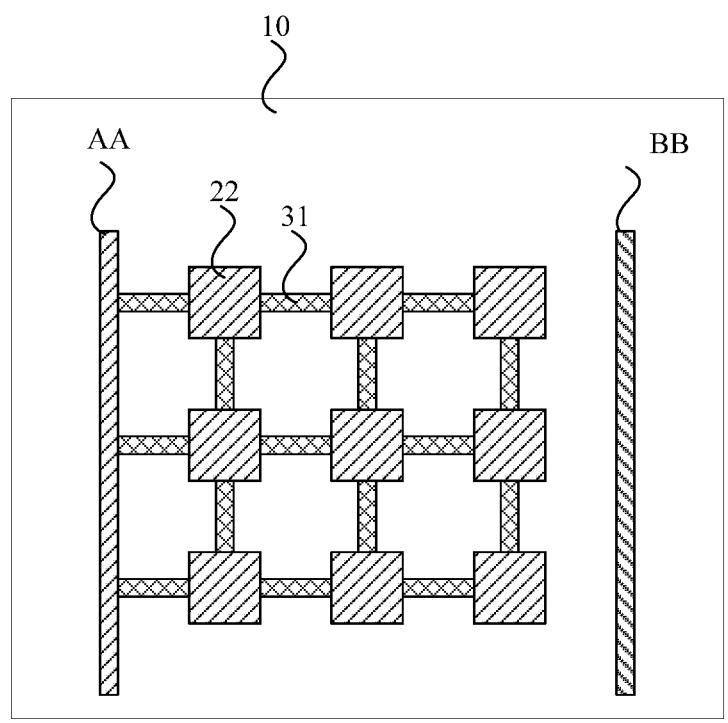
FIG. 3C is a third schematic diagram showing a first method for manufacturing an all-solid lithium battery according to an embodiment of the present disclosure.

In step 320, the positive electrode layer 22 is formed on the positive electrode current collector layer 21, as specifically shown in FIG. 3C.

Figure 3D:
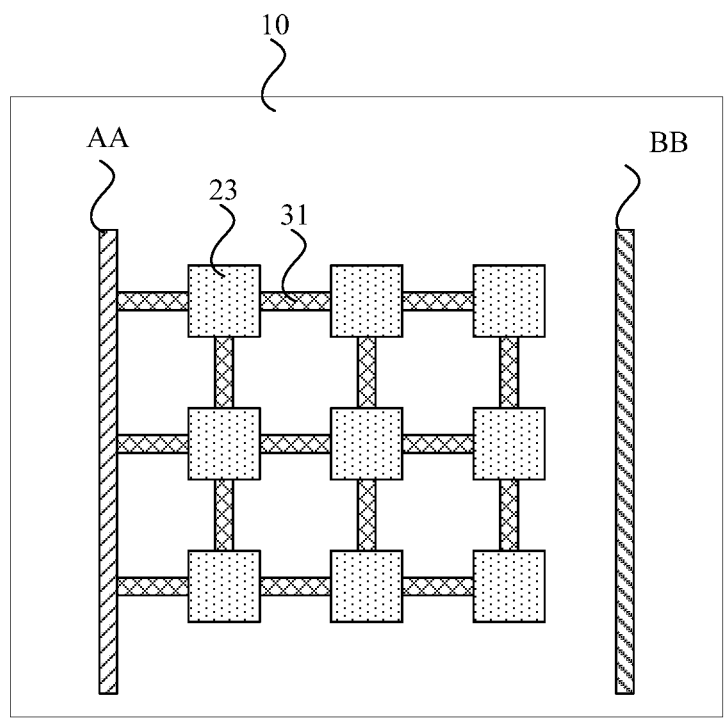
FIG. 3D is a fourth schematic diagram showing a first method for manufacturing an all-solid lithium battery according to an embodiment of the present disclosure.

In step 330, the electrolyte layer 23 is formed on the positive electrode layer 22, as specifically shown in FIG. 3D.

Figure 3E:
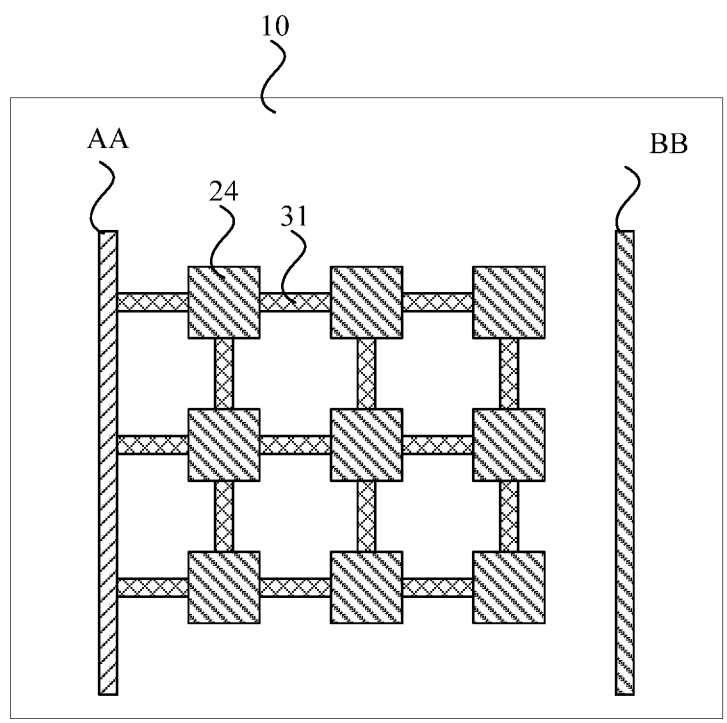
FIG. 3E is a fifth schematic diagram showing a first method for manufacturing an all-solid lithium battery according to an embodiment of the present disclosure.

In step 340, the negative electrode layer 24 is formed on the electrolyte layer 23, as specifically shown in FIG. 3E.

Figure 3F:
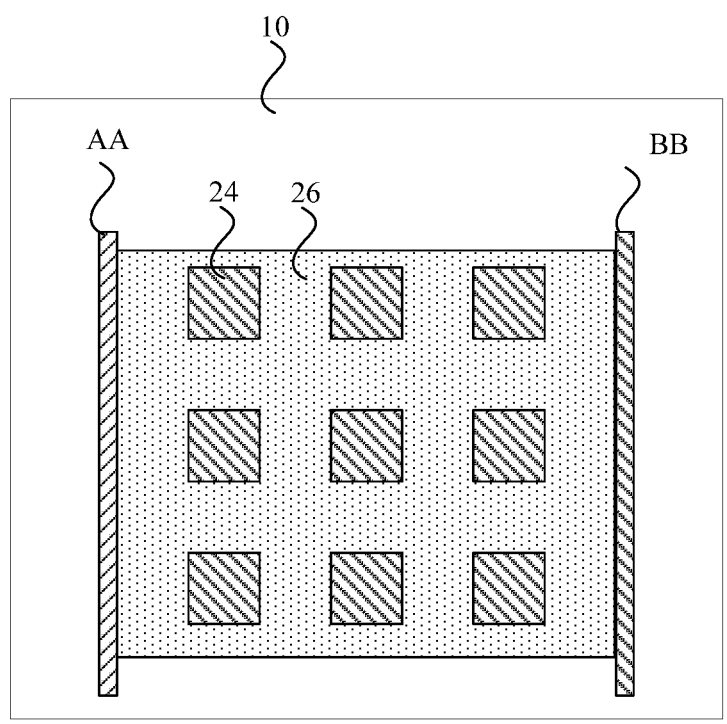
FIG. 3F is a sixth schematic diagram showing a first method for manufacturing an all-solid lithium battery according to an embodiment of the present disclosure.

In step 350, the isolation layer 26 for isolating adjacent lithium battery cells is formed on the substrate 10, as specifically shown in FIG. 3F.

Figure 3G:
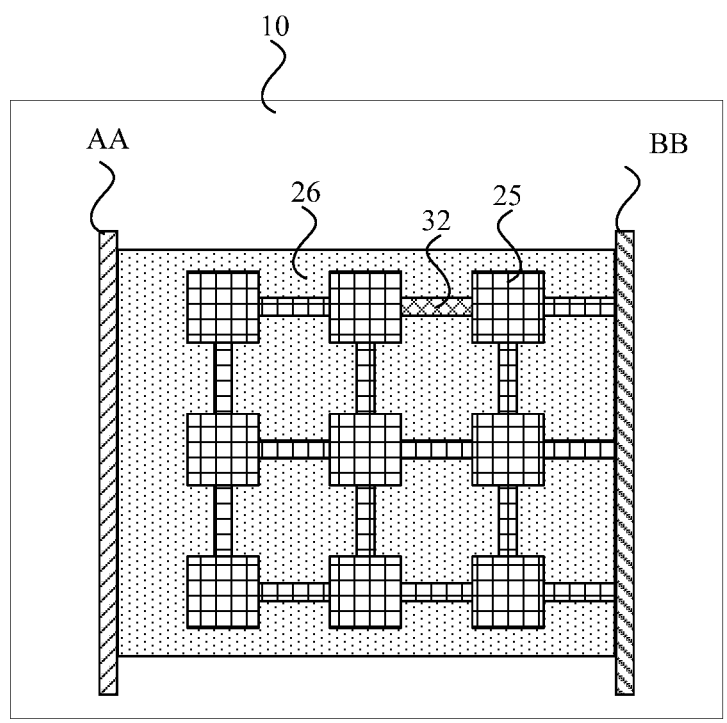
FIG. 3G is a seventh schematic diagram showing a first method for manufacturing an all-solid lithium battery according to an embodiment of the present disclosure.
Figure 3H:
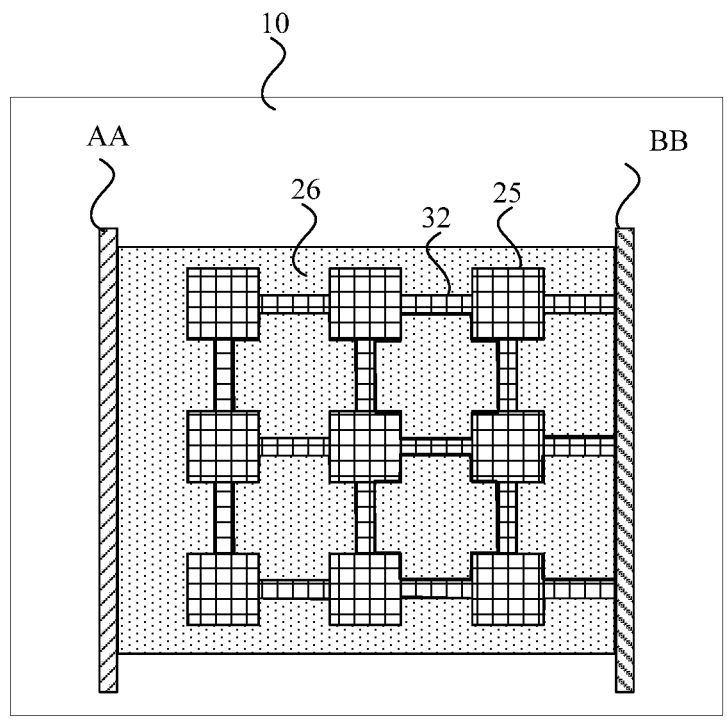
FIG. 3H is an eighth schematic diagram showing a first method for manufacturing an all-solid lithium battery according to an embodiment of the present disclosure.

In step 360, the negative electrode current collector layer 25 and the second connection layer 32 of the lithium battery cells of M rows×N columns are formed on the negative electrode layer 24 and the isolation layer 26 of the lithium battery cells of M rows×N columns, as specifically shown in FIGS. 3G and 3H.

In an embodiment, the step 360 specifically includes: depositing a negative electrode current collector film on the substrate, and etching the negative electrode current collector film by a laser process to form the negative electrode current collector layer and the second connection layer, wherein the negative current collector layer and the second connection are integrated formed. In FIG. 3G, the negative current collector layer and the second connection are formed by a laser etching process. Optionally, the negative electrode current collector layer of the lithium battery cells of M rows×N columns is formed on the substrate by an evaporation process using a first mask; and the second connection layer is formed by the evaporation process using a second mask. In FIG. 3H, the negative electrode current collector layer and the second connection layer are formed by the evaporation process.

Hereinafter, the method for manufacturing the all-solid lithium battery according to the embodiment of the present disclosure is further illustrated by FIGS. 4A to 4F, by taking an example in which the first connection layer is used to connect the positive electrode current collector layer of each of the lithium battery cells to the first electrode, the second connection layer is used to connect the negative electrode current collector layer of each of the lithium battery cells to the second electrode, and M=N=2.

Figure 4A:
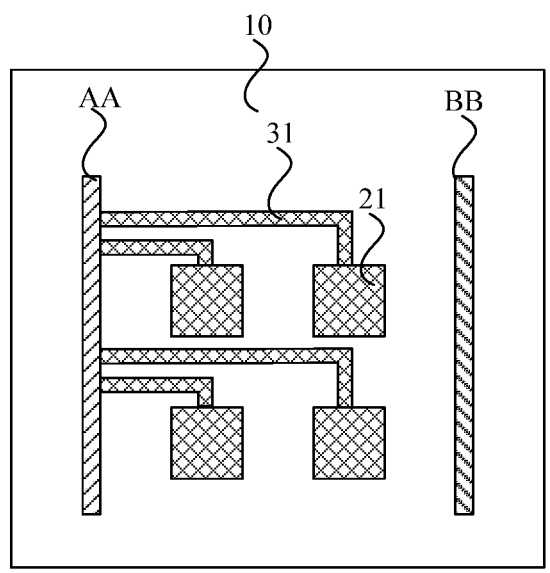
FIG. 4A is a first schematic diagram showing a second method for manufacturing an all-solid lithium battery according to an embodiment of the present disclosure.

In step 410, the first electrode AA, the second electrode BB, the positive electrode current collector layer 21 of the M rows×N columns of lithium battery cells, and the first connection layer 31 are formed on the substrate 10, as specifically shown in FIG. 4A.

In particular, it should be noted that the positive electrode current collector layer 21 and the first connection layer 31 in FIG. 4A are separately disposed, but they may also be integrally formed.

Figure 4B:
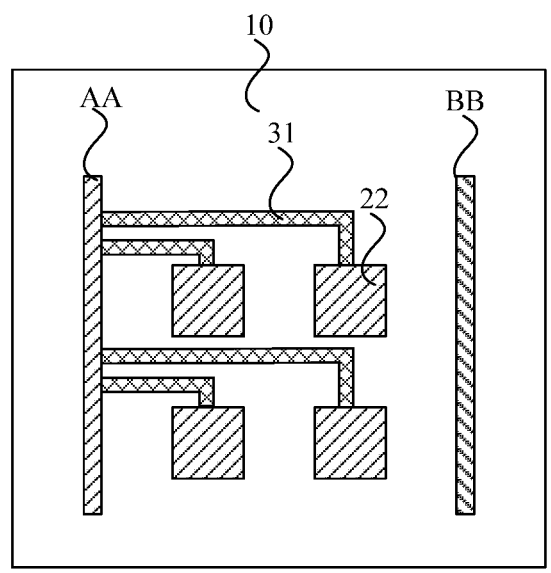
FIG. 4B is a second schematic diagram showing a second method for manufacturing an all-solid lithium battery according to an embodiment of the present disclosure.

In step 420, the positive electrode layer 22 is formed on the positive electrode current collector layer 21, as specifically shown in FIG. 4B.

Figure 4C:
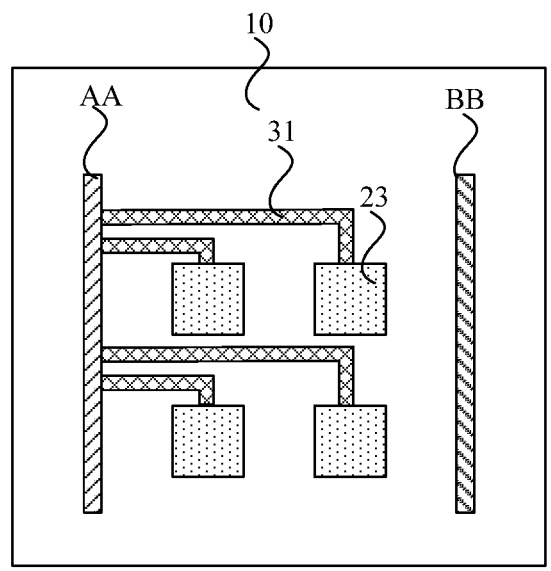
FIG. 4C is a third schematic diagram showing a second method for manufacturing an all-solid lithium battery according to an embodiment of the present disclosure.

In step 430, the electrolyte layer 23 is formed on the positive electrode layer 22, as specifically shown in FIG. 4C.

Figure 4D:
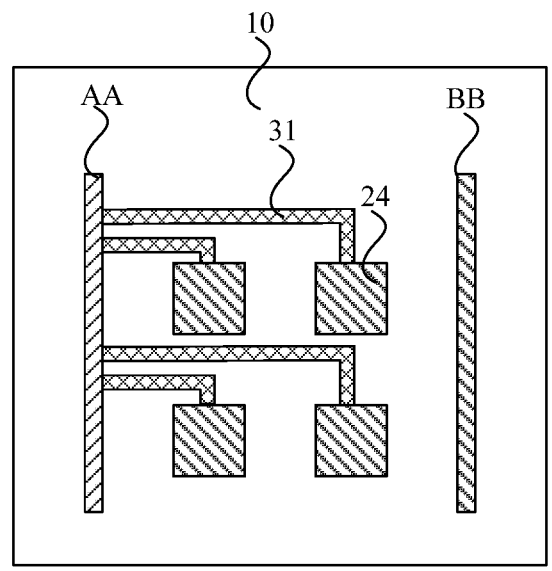
FIG. 4D is a fourth schematic diagram showing a second method for manufacturing an all-solid lithium battery according to an embodiment of the present disclosure.

In step 440, the negative electrode layer 24 is formed on the electrolyte layer 23, as specifically shown in FIG. 4D.

Figure 4E:
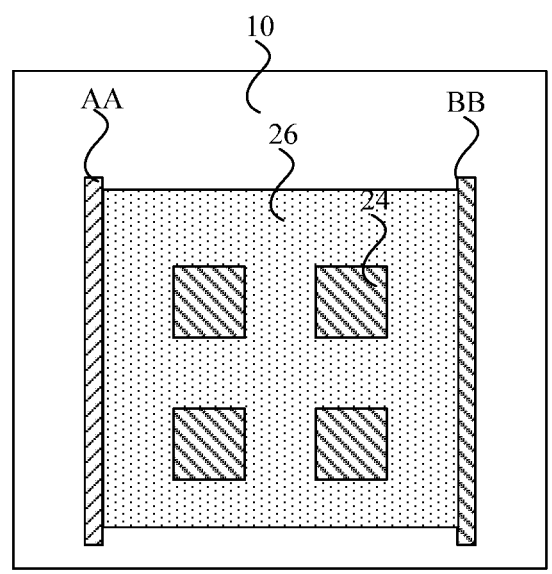
FIG. 4E is a fifth schematic diagram showing a second method for manufacturing an all-solid lithium battery according to an embodiment of the present disclosure.

In step 450, the isolation layer 26 for isolating adjacent lithium battery cells is formed on the substrate 10, as specifically shown in FIG. 4E.

Figure 4F:
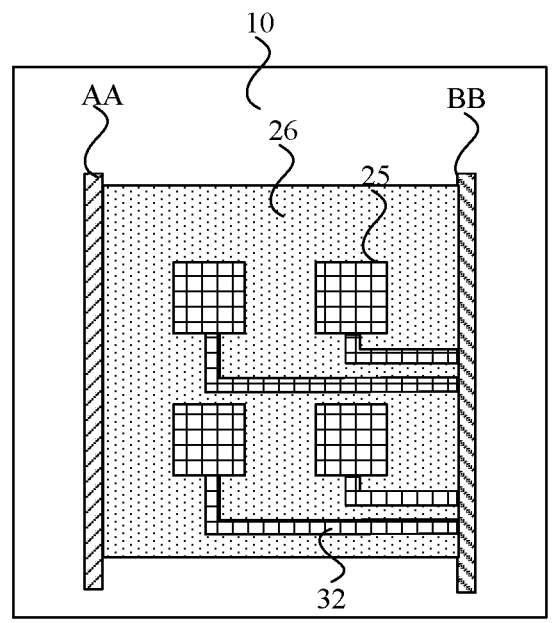
FIG. 4F is a sixth schematic diagram showing a second method for manufacturing an all-solid lithium battery according to an embodiment of the present disclosure.

In step 460, the negative electrode current collector layer 25 and the second connection layer 32 are formed on the negative electrode layer 24 and the isolation layer 26, as specifically shown in FIG. 4F.

In particular, it should be noted that the negative electrode current collector layer 25 and the second connection layer 32 in FIG. 4F are separately disposed, but they may also be integrally formed.

Figure 5:
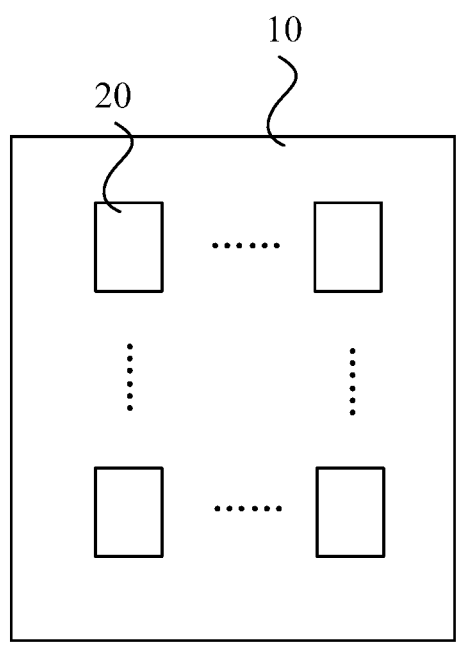
FIG. 5 is a top plan view of an all-solid lithium battery according to an embodiment of the present disclosure.
Figure 6:
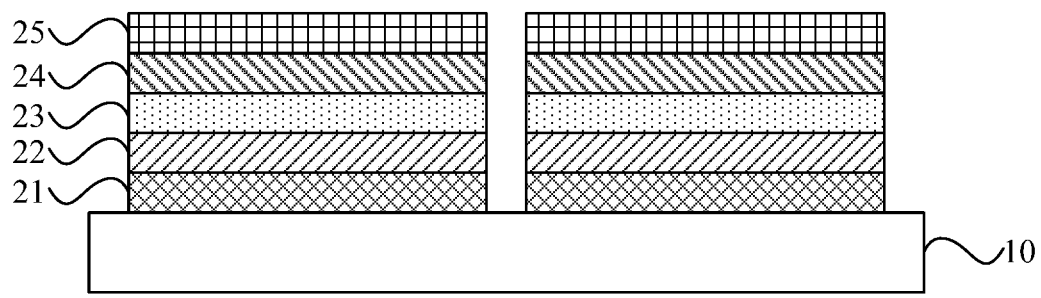
FIG. 6 is a side view of an all-solid lithium battery according to an embodiment of the present disclosure.

An embodiment of the present disclosure provides an all-solid lithium battery. FIG. 5 is a top plan view of an all-solid lithium battery according to an embodiment of the present disclosure, and FIG. 6 is a side view of an all-solid lithium battery according to an embodiment of the present disclosure. As shown in FIGS. 5 and 6, the all-solid lithium battery according to the embodiment of the present disclosure includes a substrate 10 and M rows×N columns of lithium battery cells 20 disposed on the substrate 10.

Wherein each of the lithium battery cells 20 includes a positive electrode current collector layer 21, a positive electrode layer 22, an electrolyte layer 23, a negative electrode layer 24, and a negative electrode current collector layer 25.

Optionally, the substrate 10 may be glass, plastic, polymer, metal sheet, silicon wafer, quartz, ceramic, mica, or the like. The substrate may also be a flexible substrate, wherein the flexible substrate may include polyimide (PI), polyethylene terephthalate (PET), zirconium oxide, aluminum oxide, or the like.

Optionally, the embodiment of the present disclosure does not specifically limit the number of lithium battery cells, and the arrangement manner thereof may be M×N, wherein M≥1, N≥1, and at most one of M and N is 1, which is determined according to actual needs.

Specifically, the lithium battery cells in the embodiment of the present disclosure may be disposed in the same layer, and the structure and thickness of each of the lithium battery cells may be the same. An interval between adjacent two lithium battery cells may be 1~100 microns.

Optionally, the material for forming the positive electrode current collector layer may be aluminum foil, and the material for forming the negative current collector layer may be copper foil. In order to ensure the internal stability of the current collectors in the all-solid lithium battery, the purity of both the current collectors is required to be above 98%.

Optionally, the material for forming the positive electrode layer includes nickel cobalt lithium aluminate, lithium rich, lithium manganate, lithium titanate, and lithium iron phosphate. Further, the positive electrode layer generally adopts a composite electrode. In addition to an electrode active material, a solid electrolyte and a conductive agent, which serve to transport ions and electrons in the electrodes, are included.

Optionally, the material for forming the negative electrode layer includes at least one selected from metal lithium, an alloy, and an oxide. Optionally, the alloy includes lithium alloy and/or silicon-based alloy.

Optionally, the electrolyte layer is a solid inorganic lithium ion conductor, and the preparing material thereof includes lithium phosphate (LiPO$_4$), lithium oxide (Li$_3$O$_x$), lithium titanium phosphate LiTi$_2$(PO$_4$)$_3$, or the like.

According to an embodiment of the present disclosure, there is provided an all-solid lithium battery, including: a substrate, and M rows×N columns of lithium battery cells disposed on the substrate, wherein each of the lithium battery cells includes a positive electrode current collector layer, a positive electrode layer, an electrolyte layer, a negative electrode layer, and a negative electrode current collector layer. In the embodiment of the present disclosure, by providing the lithium battery cells arranged in an array form on the substrate, it is ensured that the size of the lithium battery cells in the present application is smaller than that of the lithium battery in the prior art under the same area, the surface stress of respective film layers in the lithium battery cells is released, the cracking of each film is avoided, and the reliability of the all-solid lithium battery is improved. Further, normal operation of the all-solid lithium battery is ensured, life of the all-solid lithium battery is greatly improved, and in production, yield is also greatly increased, cost is reduced and competitiveness of products is enhanced.

Optionally, the number of the positive electrode current collector layer, the positive electrode layer, the electrolyte layer, the negative electrode layer, and the negative electrode current collector layer included in each of the lithium battery cells is each at least one. It should be noted that FIG. 5 is illustrated by taking an example in which the number of the positive electrode current collector layer, the positive electrode layer, the electrolyte layer, the negative electrode layer, and the negative electrode current collector layer is each one.

In order to improve life-span of the all-solid lithium battery, the number of the positive electrode current collector layer, the positive electrode layer, the electrolyte layer, the negative electrode layer, and the negative electrode current collector layer included in the all-solid lithium battery cell provided in the embodiment of the present disclosure may be multiple. The embodiment of the present disclosure does not specifically limit the number of each layer, which is specifically defined according to actual needs.

Figure 7:
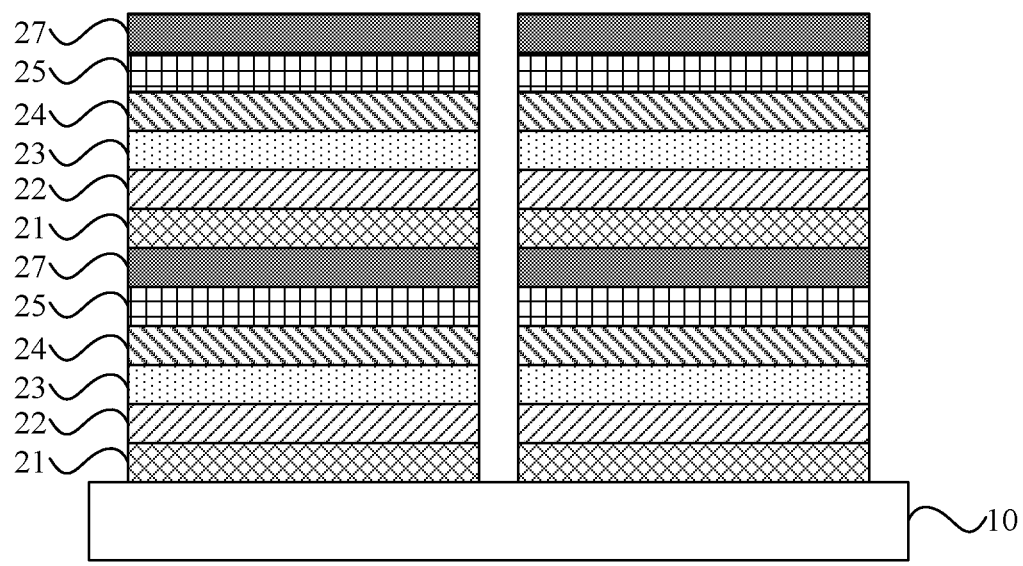
FIG. 7 is another side view of an all-solid lithium battery according to an embodiment of the present disclosure.
Figure 8:
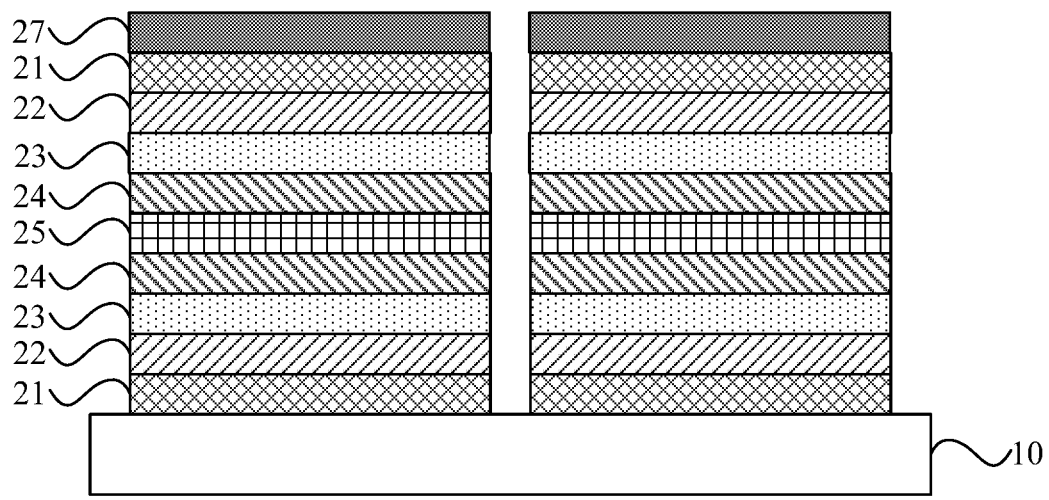
FIG. 8 is a yet another side view of an all-solid lithium battery according to an embodiment of the present disclosure.

FIG. 7 is another side view of an all-solid lithium battery according to an embodiment of the present disclosure, and FIG. 8 is a yet another side view of an all-solid lithium battery according to an embodiment of the present disclosure. FIG. 7 is illustrated by taking an example in which the number of the positive electrode current collector layer, the positive electrode layer, the electrolyte layer, the negative electrode layer, and the negative electrode current collector layer is each two. FIG. 8 is illustrated by taking an example in which the number of the positive electrode current collector layer, the positive electrode layer, the electrolyte layer, and the negative electrode current collector layer is each two, and the number of the negative electrode layer is one. It should be noted that both FIG. 7 and FIG. 8 are illustrated by taking an example of two layers of lithium batteries. In FIG. 7, the two layers of lithium batteries are formed by simple stacking two individual layers of lithium batteries. In order to further reduce the thickness of the all-solid lithium battery, the two layers of lithium batteries in FIG. 8 may be formed by sharing one negative electrode current collector layer. Similarly, in the case of three layers of lithium batteries, the first and second layers of lithium batteries may share one negative electrode current collector layer, and the second and third layers may share one positive electrode current collector layer.

Optionally, as shown in FIGS. 6, 7 and 8, the positive electrode current collector layer 21, the positive electrode layer 22, the electrolyte layer 23, the negative electrode layer 24, and the negative electrode current collector layer 25 in the lithium battery cells are sequentially disposed on the substrate 10.

As shown in FIGS. 7 and 8, the all-solid lithium battery according to the embodiment of the present disclosure further includes an encapsulation layer 27 disposed on the lithium battery cells.

The encapsulation layer provided in the embodiment of the present disclosure may greatly improve ability against air and moisture permeation of the battery, and extend the operation and storage life of the battery.

Optionally, the material for forming the encapsulation layer 27 may be aluminum oxide ($Al_2O_3$), silicon oxide, or silicon nitride.

Optionally, as an embodiment, a multi-layer lithium battery structure may be formed by simple stacking of a plurality of individual layers of lithium batteries, wherein two adjacent layers of lithium batteries are separated by the encapsulation layer, and the encapsulation layer is each disposed on negative electrode current collectors of each layer of the lithium battery.

Optionally, as another embodiment, a multi-layer lithium battery structure may also be formed by sharing negative or positive electrode current collectors for two adjacent layers of lithium batteries, wherein the encapsulation layer is disposed on the top lithium battery. When the number of the layers of the lithium batteries is an even number, the encapsulation layer is disposed on the positive electrode current collectors of the top lithium battery, but when the number of the layers of the lithium batteries is an odd number, the encapsulation layer is disposed on the negative electrode current collectors of the top lithium battery.

Figure 9:
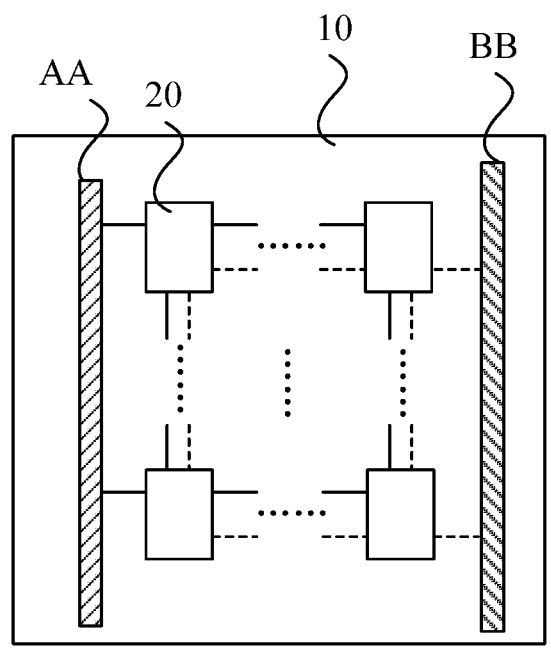
FIG. 9 is a first structural schematic diagram showing an all-solid lithium battery according to an embodiment of the present disclosure.
Figure 10:
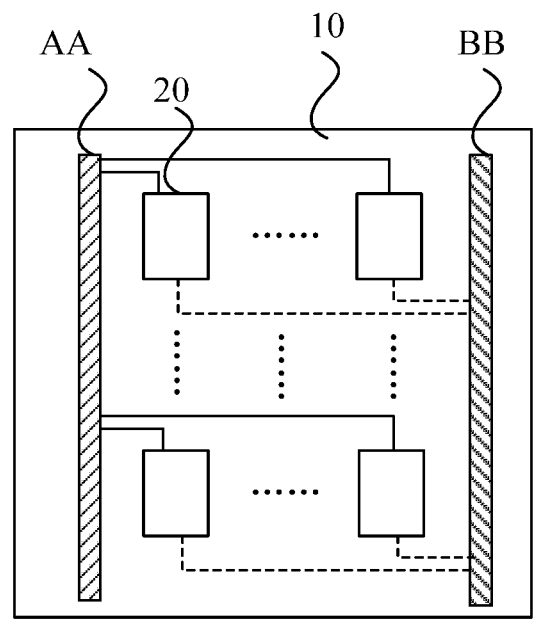
FIG. 10 is a second structural schematic diagram showing an all-solid lithium battery according to an embodiment of the present disclosure.

Specifically, FIG. 9 is a first structural schematic diagram showing an all-solid lithium battery according to an embodiment of the present disclosure, and FIG. 10 is a second structural schematic diagram showing an all-solid lithium battery according to an embodiment of the present disclosure. As shown in FIGS. 9 and 10, the all-solid lithium battery according to the embodiment of the present disclosure further includes a first electrode AA and a second electrode BB disposed on the substrate 10.

Optionally, the first electrode is a positive electrode, the second electrode is a negative electrode, and the first electrode and the second electrode are disposed on two sides of the substrate, respectively. The embodiment of the present disclosure does not specifically limit the positions of the first and second electrodes.

Figure 11:
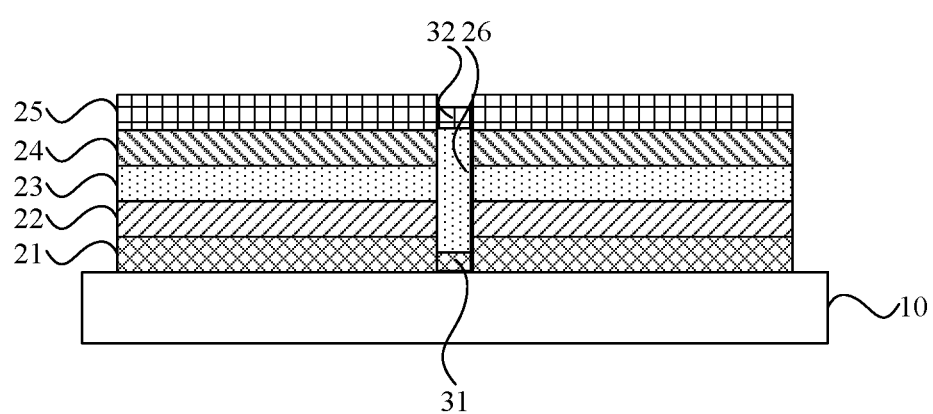
FIG. 11 is a side view corresponding to FIG. 9.

In particular, as an embodiment, FIG. 11 is a side view corresponding to FIG. 9. As shown in FIGS. 3G, 3H and 11, the all-solid lithium battery according to the embodiment of the present disclosure further includes a first connection layer 31 and a second connection layer 32.

In the present embodiment, as shown in FIGS. 3G, 3H and 11, the first connection layer 31, which is disposed on the same layer as the positive electrode current collector layer 21, is used to connect the positive electrode current collector layers of the adjacent lithium battery cells, and to connect the positive electrode current collector layer of the lithium battery cell in the first column to the first electrode; and the second connection layer 32, which is disposed on the same layer as the negative electrode current collector layer, is used to connect the negative electrode current collector layers of the adjacent lithium battery cells, and to connect the negative electrode current collector layer of the lithium battery cell in the last column to the second electrode.

Figure 12:
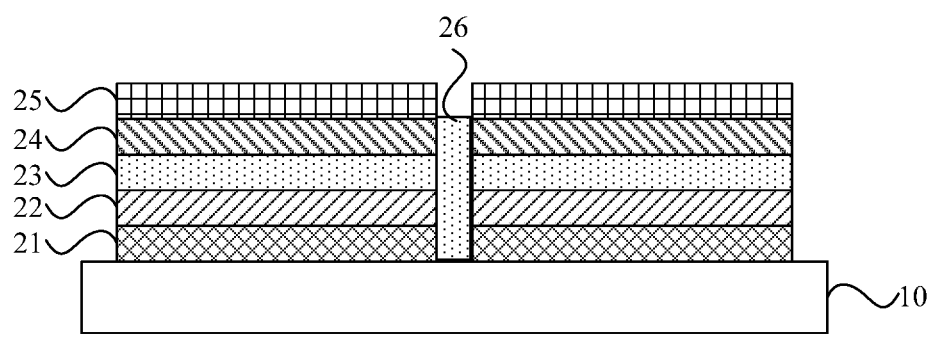
FIG. 12 is a side view corresponding to FIG. 10.

In particular, as another embodiment, FIG. 12 is a side view corresponding to FIG. 10. As shown in FIGS. 4F and 12, the all-solid lithium battery according to the embodiment of the present disclosure further includes a first connection layer 31 and a second connection layer 32.

Specifically, the first connection layer 31, which is disposed on the same layer as the positive electrode current collector layer, is used to connect the positive electrode current collector layer of each of the lithium battery cells to the first electrode; and the second connection layer 32, which is disposed on the same layer as the negative electrode current collector layer, is used to connect the negative electrode current collector layer of each of the lithium battery cells to the second electrode.

Optionally, as shown in FIGS. 11 and 12, the all-solid lithium battery further includes an isolation layer 26 disposed on the substrate 10.

The isolation layer 26 is used for isolating the positive electrode current collector layer, the positive electrode layer, the electrolyte layer and the negative electrode layer of adjacent lithium battery cells.

Particularly, when the all-solid lithium battery according to the embodiment of the present disclosure is charged, the lithium atoms in the positive electrode layer of each lithium battery cell lose one electron to become lithium atoms, and the lithium atoms move toward the negative electrode layer through the electrolyte layer of the lithium battery cell, and combine with external electrons in the negative electrode layer to generate lithium atoms stored in the negative electrode layer. That is, at the time of charging, a current flows to the positive electrode layer, and at the time of discharging, the process is reversed, and the current flows to the negative electrode layer.

Optionally, an interval between adjacent lithium battery cells is 1~100 microns. It should be noted that the adjacent lithium battery cells include adjacent row lithium battery cells and adjacent column lithium battery cells. The interval between adjacent lithium battery cells may be the same or different, which is not limited by the embodiment of the present disclosure.

The drawings of the embodiments of the present disclosure relate only to the structures involved in the embodiments of the present disclosure, and other structures may refer to the general design.

For the sake of clarity, the thickness and size of the layers or microstructures are exaggerated in the drawings used to describe embodiments of the present disclosure. It may be understood that when an element such as a layer, a film, a region, or a substrate is referred to as being "on" or "under" another element, it may be "directly on or under" another element, or an intermediate element may also present.

In the case of no conflict, the embodiments of the present disclosure, that is, the features in the embodiments, may be combined with each other to obtain a new embodiment.

Although the embodiments disclosed in the present disclosure are as described above, they are merely implementation adopted for facilitating the understanding of the present disclosure, and are not intended to limit the present disclosure. Any modification or variation in the form and details of the implementation may be made by one skilled in the art to which the present disclosure pertains without departing from the spirit and scope of the disclosure, but the scope of the present disclosure is to be determined by the appended claims.

What is claimed is:

1. A method for manufacturing an all-solid lithium battery, comprising:
   providing a substrate;
   forming M rows×N columns of lithium battery cells on the substrate, wherein each of the lithium battery cells comprises a positive electrode current collector layer, a positive electrode layer, an electrolyte layer, a negative electrode layer, and a negative electrode current collector layer, M≥1, N≥1, and at most one of M and N is 1; and
   forming a first electrode and a second electrode on the substrate,
   wherein the forming of the M rows×N columns of lithium battery cells on the substrate comprises:
   forming the positive electrode current collector layer of the M rows×N columns of lithium battery cells and a first connection layer on the substrate, the first connection layer connecting the positive electrode current collector layer of each of the lithium battery cells to the first electrode;
   sequentially forming the positive electrode layer, the electrolyte layer and the negative electrode layer on the positive electrode current collector layer;
   forming an isolation layer for isolating adjacent lithium battery cells on the substrate; and
   forming the negative electrode current collector layer and a second connection layer on the negative electrode layer and the isolation layer, the second connection layer connecting the negative electrode current collector layer of each of the lithium battery cells to the second electrode;
   wherein there are a plurality of positive electrode current collector layers and a plurality of negative electrode current collector layers; the positive electrode current collector layers between adjacent lithium battery cells are not connected with one another, and the negative electrode current collector layers between adjacent lithium battery cells are not connected with one another.

2. The method according to claim 1, wherein the forming of the positive electrode current collector layer of the M rows×N columns of lithium battery cells and the first connection layer on the substrate comprises:
   depositing a positive electrode current collector film on the substrate, and etching the positive electrode current collector film by a laser process or a photolithography process to form the positive electrode current collector layer and the first connection layer; or
   forming the positive electrode current collector layer of the M rows×N columns of lithium battery cells on the substrate by an evaporation process using a first mask, and forming the first connection layer by the evaporation process using a second mask.

3. The method according to claim 1, wherein the forming of the negative electrode current collector layer and the second connection layer on the negative electrode layer and the isolation layer comprises:
   depositing a negative electrode current collector film on the negative electrode layer and the isolation layer, and etching the negative electrode current collector film by a laser process to form the negative electrode current collector layer and the second connection layer; or
   forming the negative electrode current collector layer on the negative electrode layer and the isolation layer by an evaporation process using a first mask, and forming the second connection layer by the evaporation process using a second mask.

4. The method according to claim 1, further comprising: forming an encapsulation layer on the lithium battery cells.

5. An all-solid lithium battery, comprising:
   a substrate;
   M rows×N columns of lithium battery cells disposed on the substrate, wherein each of the lithium battery cells comprises a positive electrode current collector layer, a positive electrode layer, an electrolyte layer, a negative electrode layer, and a negative electrode current collector layer, M≥1, N≥1, and at most one of M and N is 1;
   a first electrode and a second electrode disposed on the substrate;
   a first connection layer and a second connection layer, wherein the first connection layer is disposed on a same layer as the positive electrode current collector layer, and connects the positive electrode current collector layer of each of the lithium battery cells to the first electrode; and the second connection layer is disposed on a same layer as the negative electrode current collector layer, and connects the negative electrode current collector layer of each of the lithium battery cells to the second electrode; and an isolation layer disposed on the substrate, wherein the isolation layer isolates the positive electrode current collector layer, the positive electrode layer, the electrolyte layer, and the negative electrode layer of adjacent lithium battery cells;

wherein there are a plurality of positive electrode current collector layers and a plurality of negative electrode current collector layers, the positive electrode current collector layers between adjacent lithium battery cells are not connected with one another, and the negative electrode current collector layers between adjacent lithium battery cells are not connected with one another.

6. The all-solid lithium battery according to claim 5, wherein an interval between adjacent lithium battery cells is 1~100 microns.

7. The all-solid lithium battery according to claim 5, further comprising an encapsulation layer disposed on the lithium battery cells.

8. The all-solid lithium battery according to claim 5, wherein the all-solid lithium battery comprises a stacking structure of multi-layer of the M rows×N columns of lithium battery cells, any two adjacent layers of lithium battery cells are separated by an encapsulation layer, and the encapsulation layer is provided on negative electrode current collectors of each layer of the lithium battery cells.

9. The all-solid lithium battery according to claim 5, wherein:

the all-solid lithium battery comprises a stacking structure of multi-layer of the M rows×N columns of lithium battery cells, any two adjacent layers of lithium battery cells share negative electrode current collectors or positive electrode current collectors, an encapsulation layer is disposed on a top layer of lithium battery, and the encapsulation layer is disposed on the positive electrode current collectors of the top layer of lithium battery when there are an even number of layers of the lithium battery cells, or the encapsulation layer is disposed on the negative electrode current collectors of the top layer of lithium battery when there are an odd number of layers of the lithium battery cells.

* * * * *